United States Patent [19]

Jandourek et al.

[11] Patent Number: 4,830,750
[45] Date of Patent: May 16, 1989

[54] FILTER BELT ARRANGEMENT

[75] Inventors: Jiri Jandourek, Dingle; Dan Nord, Hindås, both of Sweden

[73] Assignee: Bat o Fangst AB, Dingle, Sweden

[21] Appl. No.: 67,301

[22] PCT Filed: Oct. 21, 1986

[86] PCT No.: PCT/SE86/00486
§ 371 Date: Jun. 17, 1987
§ 102(e) Date: Jun. 17, 1987

[87] PCT Pub. No.: WO87/02266
PCT Pub. Date: Apr. 23, 1987

[51] Int. Cl.⁴ ............................................. B01D 33/04
[52] U.S. Cl. .................................. 210/393; 210/400; 210/500.1
[58] Field of Search ............... 210/391, 393, 400, 401, 210/160, 500.1; 162/348; 204/283, 304, 206

[56] References Cited

U.S. PATENT DOCUMENTS 2,346,500  4/1944  Moore ................................. 210/400

FOREIGN PATENT DOCUMENTS 2273575  2/1976  France .............................. 210/393
1002736  2/1957  German Democratic Rep. .................................... 210/401
  22732  of 1908  United Kingdom ................ 210/391
1388554  3/1975  United Kingdom ................ 210/393

Primary Examiner—Richard V. Fisher
Assistant Examiner—Linda S. Evans

[57] ABSTRACT

A filter arrangement comprises a belt filter for the separation of particles from a liquid, for which purpose the liquid is caused to flow towards the filter through an inlet (13) at one end of the filter, and the separated particles are collected at the opposite end. The belt filter consists of an endless filter belt (10) which runs over guide rollers (2, 3) in the direction of the water as it flows in, and supports and drains the particles as they are conveyed on an upper, forward-moving part of the filter belt from one end to the opposite end over a first drainage zone. A second drainage zone is arranged on the upper part (11) of the belt by the arrangement of a drainage arrangement (17) which comprises a blower unit (18) extending across the entire width of the filter belt (10) to direct currents of air against the under-side of the upper part (11) of the filter belt (10), so as to blow water from the belt and the particles over the second drainage zone. A deflector device (19) situated on the upper side of the upper part of the filter belt above the blower device is arranged to guide the water blown by the current of air in the direction of the deflector device back onto the upper side of the filter belt in front of the second drainage zone, against the direction of transport of the upper part of the belt.

12 Claims, 3 Drawing Sheets

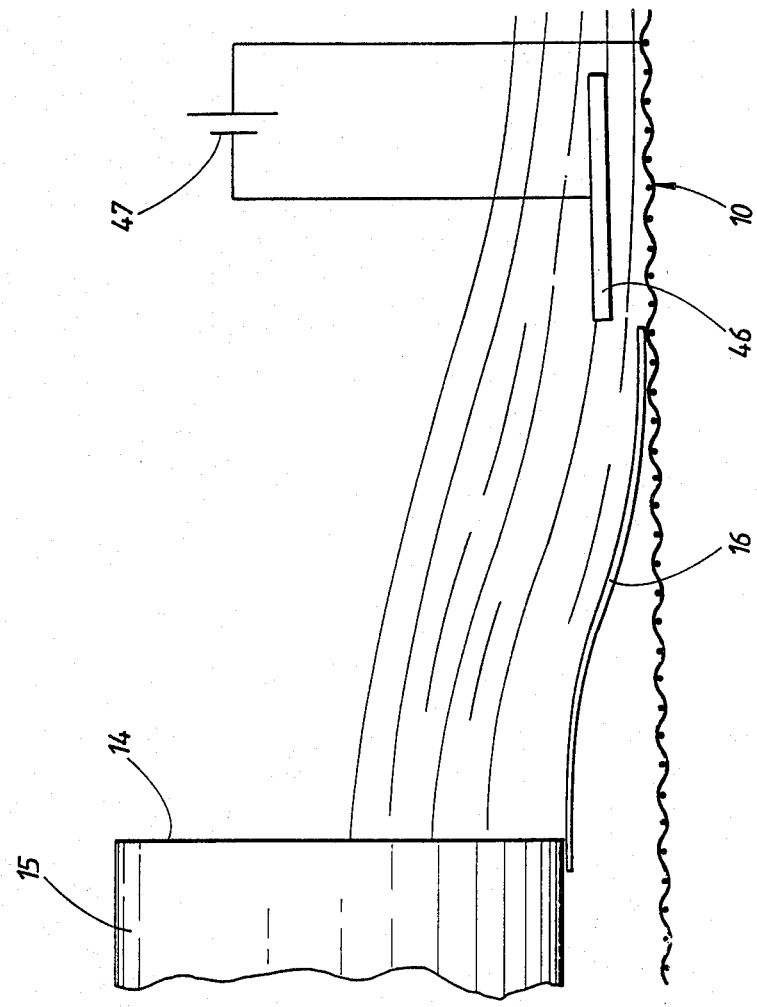

FILTER BELT ARRANGEMENT

TECHNICAL FIELD

The present invention relates to a filter arrangement which consists of a belt filter for the separation of particles from a liquid, for which purpose the liquid is caused to flow in towards the filter through an inlet at one end of the filter, and the separated particles are collected at the opposite end of the filter, in conjunction with which the belt filter consists of at least one endless filter belt which is caused to run over a front and a rear guide roller in the direction of the water as it flows in, and to support and drain the particles as they are conveyed in a desired direction of transport on an upper, forward-moving part of the filter belt from one end to the opposite end over a first drainage zone, whilst cleaned liquid is caused to pass through at least the aforementioned upper part.

BACKGROUND

No effectively functioning separation plant has been available until now for the separation of certain types of impurity particles and sediment, etc., from water in the basins used for special fish breeding. A customary type of plant utilizes rotating filter drums, in which problems with the clogging of the filter surface are encountered, however, in spite of the continuous cleaning of the perforations in the surface of the filter. Belt filters with an endless filter belt running over two rollers are also subject to clogging, unless special measures are taken to prevent this.

TECHNICAL PROBLEM

The object of the present invention is to make available by means of the arrangement in accordance with the invention effectively functioning filtration in which clogging and the associated reduction in capacity are counteracted.

THE SOLUTION

The aforementioned object is achieved by means of an arrangement which is characterized in that a second drainage zone is arranged on the upper part of the belt after the aforementioned first drainage zone by the arrangement on the latter zone of a drainage arrangement which comprises on the one hand a blower unit extending across the entire width of the filter belt and so arranged as to direct currents of air against the under side of the upper part of the belt of the filter belt, and in so doing as to blow water from the belt and the particles over the aforementioned second drainage zone of the belt, and on the other hand a deflector device situated on the upper side of the upper part of the filter belt above the aforementioned blower device and so arranged as to guide the water blown by the current of air in the direction of the aforementioned deflector device back onto the upper side of the filter belt in front of the aforementioned drainage zone, that is to say against the aforementioned direction of transport.

BRIEF DESCRIPTION OF DRAWINGS

The invention is described below in greater detail as an illustrative embodiment with reference to the accompanying drawings, in which:

FIG. 3 shows a diagrammatic view of a part of the filter on an enlarged scale.

BEST MODE OF CARRYING OUT THE INVENTION

Figure 1:
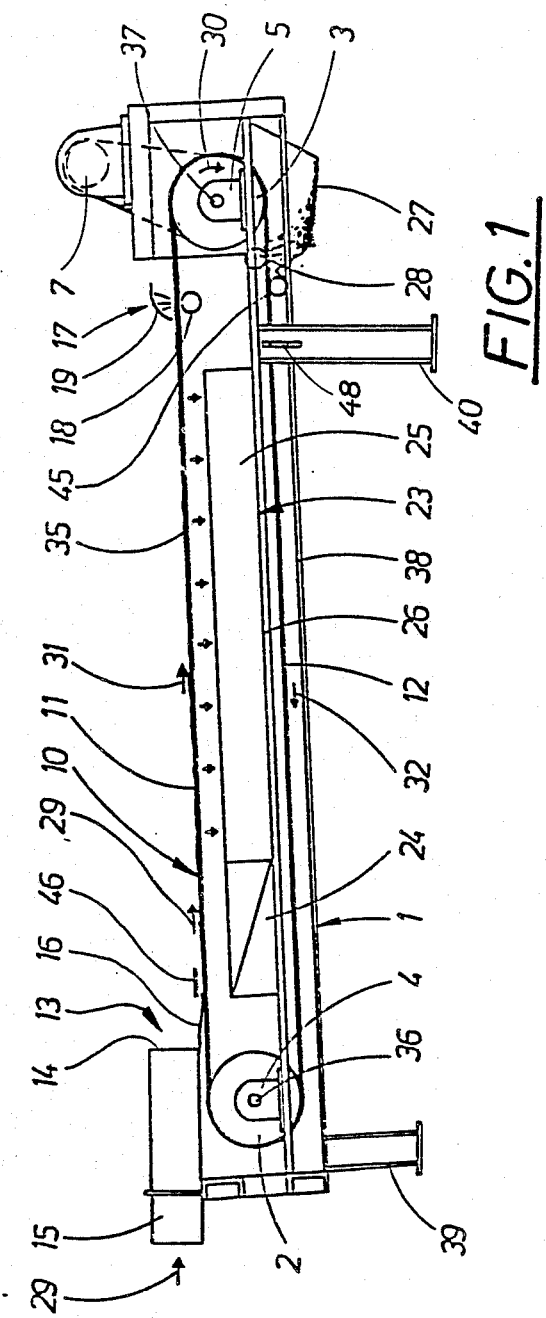
FIG. 1 shows a diagrammatic side view of a filter in accordance with the invention.
Figure 2:
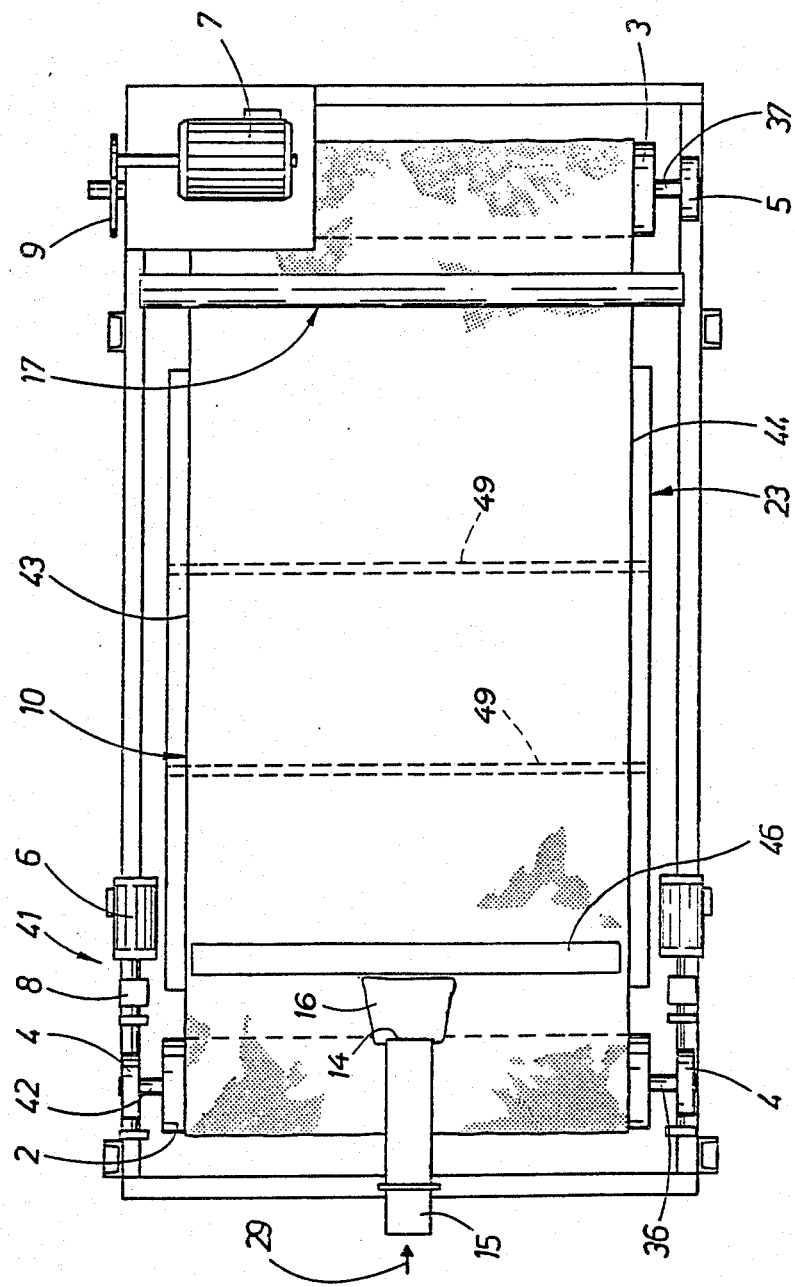
FIG. 2 shows a plan view of the filter.

As will be appreciated from FIGS. 1 and 2, the filter arrangement in accordance with the invention is of the belt filter type and is constructed from a machine frame 1, in which a front and a rear guide roller 2, 3 are respectively rotatbly supported in bearing blocks 4, 5. In the illustrated example one of the guide rollers 3 is driven by means of an electric drive motor 7 via a gear arrangement 9 with variable speed of roation of the guide roller 3.

Around the two guide rollers 2, 3 there runs an endless filter belt 10, which exhibits an upper, forward-moving part 11 and a lower return part 12. The filter belt 10 consists of a filter screen, which is constructed with advantage from metal wires in the formof meshes.

The belt filter exhibits an inlet 13 to the filter situated at one end of the belt filter above its front guide roller 2. The inlet 13 is executed in the form of the outlet end 14 of a pipe 15 for contaminated water which is transported to the belt filter for the purpose of separating out impurity particles. Situated at the outlet end 14 below the outlet opening itself is a flexible cloth 16 made of textile material, woven plastic, plastic film or similar. The cloth is attached to the pipe 15 and trails on the filter belt so as to provide a gentle transition for the water from the higher level inside the pipe to the level of the filter belt.

At the end of the drainage section formed by the first upper, forward-moving part 11 of the filter belt 10 there is arranged a second drainage arrangement 17 in order to provide increased drainage through the blowing away of the largest possible proportion of the water contained in the contaminated water on the filter belt. The second drainage arrangement 17 consists of a blower unit in the form of a transverse pipe 18 provided with nozzle devices which face towards the under side of the upper part 11 of the filter belt. The aforementioned nozzle devices may consist either of a single long slot which extends over essentially the entire width of the filter belt, or of a number of nozzles distributed along the length of the pipe 18. This arrangement for supplementary drainage also exhibits a deflector device in the form of a curved shield 19 which extends across the width of the filter belt above its upper part 11 and essentially directly in the line with the aforementioned blower unit. The pipe 18 is connected to a fan or to a source of compressed air for the purpose of creating an air flow through the aforementioned nozzle devices which will reduce the water content in the sediment carried on the belt filter. The shield exhibits a curved cross-section, essentially in the form of the arc of a circle in the illustrated example, essentially having a length of arc of one quarter of a circle. It faces in such a way that it is convex upwards and forwards against the direction of movement of the upper part 11 of the belt. The shield 19 also has a lower, long edge section which is arranged close to the filter belt so as to leave a small space, which forms a gap. The gap formed in this way permits the passage of separated particles, which are supported and advanced on the filter belt. The shield thus forms essentially one half of a covering shield with an upper long edge section which faces in the direction of advance of the upper part 11 of the belt, that is to say towards the rear end of the belt filter.

A collecting receptacle 23 for the cleaned water is arranged in the illustrated example between the upper part 11 and the lower part 12 of the filter belt 10, from which receptacle a sideways-facing outlet 24 for cleaned water leads. This can be discharged either directly into a basin, for example, situated alongside the filter, or can be transported in a return pipe (not shown here) to a desired point. It is obvious that the collecting receptacle 23 is open at the top for the purpose of accepting the cleaned water and exhibits surrounding side walls 25 and a base 26.

A collecting receptacle 27 for the impurity particles is situated below the rear guide roller 3. Arranged in conjunction with the rear guide roller 3 between the upper and lower parts 11, 12 of the filter belt 10 is a cleaning arrangement 28 for the removal of sediment and impurity particles through the process of flushing out the filter belt from the inside. The cleaning arrangement consists of a pipe with air nozzles, which extends across the width of the filter belt, or alternatively with water nozzles for flushing out with water under pressure. Alternatively, a single slot in a tube may constitute the nozzle, that is to say the discharge opening, the area of which may be adjustable. The flow of air through the nozzle or nozzles can be generated by means of a fan in an air line leading to the ramp, or by connection to a source of compressed air.

Separation by means of the belt filter in accordance with the invention takes place as follows. Contaminated water, for example from one or more fish breeding basins, is led through the pipe 15 and out via its outlet end 14. As will be appreciated, in particular from FIG. 2, the pipe 15 has a diameter which is considerably smaller than the width of the belt filter. The large width is necessary in order to achieve a large filter surface area and high filtration capacity. The natural tendency of the water to flow outwards as it leaves the pipe 15 leads to the excellent distribution of the mass of water over a large proportion of the entire width of the filter. The arrow 29 marks the direction of flow of the contaminated water. The filter belt is caused to rotate slowly by the rotation of the guide roller 3, which is driven by the drive motor 7. The guide roller 2 is in turn caused to rotate by the movement of the belt 10. The guide rollers in this way rotate in a clockwise direction, as shown by the arrow 30 in FIG. 1, in conjunction with which the filter belt 10 is caused to move in the direction of movement of the arrows 31, 32. The contaminated water flows out from the discharge end 14 of the pipe 15, over the cloth 16 and out over the filter belt 10 as the latter moves slowly forwards. The filter belt 10 endeavours to maintain the cloth 16 essentially extended, so that it forms a gentle transition from the pipe to the belt. The water thus flows in over the filter, viewed from the side, in line with the direction of movement of the filter, more precisely the direction of its upper part 11. Because the filter belt has a very large number of filter openings of well specified size distributed over the entire surface area of the filter belt, particles down to a certain dimension, for example down to a few tenths of a millimetre, are trapped on the filter belt whilst the water in a cleaned state passes through the filter belt and falls down into the collecting receptacle 23; see the arrows 35. For the entire length of the upper, forward-moving part 11 of the band filter, that is to say between the front roller 2 and the rear roller 3, the particles are drained successively whilst water passes through the filter belt, and are supported by the belt, which in so doing also functions as a conveyor for the impurity particles.

As will be appreciated from FIG. 1, the filter belt 10 exhibits at its upper and lower parts 11, 12 a small upward incline relative to the horizontal plane against the advancing contaminated water, which results in an increased draining capacity by comparison with a horizontal filter due to the endeavour of the water to be held back in its direction of flow. To the extent that the water does not manage to pass through the filter belt at the end of its upper part 11, that is to say in the area ahead of the guide roller 3, the water will endeavour to flow back against the direction of flow of the water from the inlet, rather than in the opposite direction. Drops of water are suspended from the under side of the upper part 11 of the filter belt 10 and move against the direction of travel of the filter if an adequate incline is present, in so doing promoting drainage. The degree to which this is a pronounced tendency depends on many factors, such as the inclination of the filter belt, its permeability, the belt speed and the quantity of contaminated water flowing in per unit of time. The inclination of the filter belt is achieved by positioning the axis of rotation 36 of the front roller 2 slightly below the axis of rotation 37 of the rear roller 3. This is achieved in the illustrated example through the frame of the machine consisting of a horizontal frame 38 which carries the rollers 2, 3 and is carried by two pairs of supporting legs 39, 40. One pair of supporting legs 40 exhibits an adjuster arrangement 48 by means of which the frame 38 can be raised and lowered in order to provide different angles of inclination of the belt. A horizontal position can also be selected. Because the collecting receptacle 23 is supported by the frame 38, the receptacle will also accompany the adjustment movements and will be imparted with the same inclination as the upper and lower part 11, 12 of the filter belt.

For the purpose of achieving positional stability of the filter belt 10 with regard to the sideways movement of the belt on the rollers 2, 3, an adjustment device 41 is arranged on each end 36, 42 of the shaft of the first guide roller 2 for the purpose of adjusting both of the shaft ends of the guide roller, these being the bearing blocks 4 in practice. This is achieved through these being capable of fore-and-aft displacement for a short distance transversely to the longitudinal axis of the shaft 36 by means of a drive motor 6 on either side of the roller. The rotational movement of the drive motor 6 is converted into linear movement via a linear actuator 8. The actuator consists of, for example, a ball nut of a previously disclosed kind. The drive motors are controlled by two positional sensors (not shown here) for the longitudinal edges 43, 44 of the filter belt. The positional sensors may consist of electrical limit switches which are situated on the longitudinal edges and control the drive motors 6 so as to rotate in one or other direction of rotation and for periods of different duration, in order to effect a small swing of the shaft 36 once the sideways movement of the filter belt has reached a selected end position at one end or the other of the rollers 2, 3. For example, once the longitudinal edge 43 of the filter belt has reached its extreme end position, the end 42 of the shaft is displaced in such a way that the belt is tensioned along the same longitudinal edge, causing the movement of the belt to change direction towards the opposite end of the rollers, where identical sensing takes place. Displacement of the end of the shaft can take place on both sides of the roller, so as to enable good tensioning of the belt to be maintained at all times.

The drainage on the upper part 11 of the belt of the filter belt can be divided into two drainage zones, namely a first drainage zone which extends from the inlet 13 to the belt filter and forwards to the drainage arrangement 17, and a second drainage zone which extends over an area directly in line with the drainage arrangement 17. In the first drainage zone drainage takes place in accordance with the procedure outlined above through mechanical filtration, whereas in the second drainage zone the degree of drainage is increased steeply by means of the drainage arrangement 17, into which a strong current of air is directed through the aforementioned pipe 18 towards the inside of the filter belt, more precisely the under side of the upper part of the belt. In this way any residual water content is largely removed from the passing sediment particles by most of the water being caused to return to the rear end of the leading, first drainage zone. In this way even the drops of water suspended from the under side of the filter belt are removed by being blown off, so that they do not accompany the belt to the guide roller 3. Liquid is driven out of the sediment particles by causing currents of air to pass through the filter belt over a strip-shaped zone running transversely across the filter belt, which zone constitutes the second drainage zone, in conjunction with which the rate of flow of the currents of air is sufficiently high to produce splashing and spraying of the water, which moves upwards directly in line with the shield 19, which shield 19 collects the water spray. The pressure of the air current and the form of the shield are adapted in such a way that the water runs along the inside of the shield and back along the belt ahead of said second drainage zone. In spite of the fact that a certain increase in the water content of the sediment particles takes place at the precise moment when they pass through the gap beneath the lower longitudinal edge part of the screen, the overall result is for steeply increased drainage to be achieved on passing through this second drainage zone.

The by now largely drained impurity particles are transported towards the rear guide roller 3, and as the filter belt passes around the roller by far the majority of the particles will accompany the filter belt 10 around the guide roller 3. Nevertheless, a few large objects will be caused by their weight to drop into the collecting receptacle 27 which is positioned beneath the guide roller 3 and extends over the entire width of the filter belt. The collecting receptacle 27 extends for a distance such that it is also present beneath the cleaning arrangement 28, which is continuously in operation whilst the belt filter is in motion, whereby any remaining particles and sediment are effectively blown down or washed down from the filter belt and into the collecting receptacle. This cleaning is presumably effective because it takes place through the filter belt from the side which lies opposite that side on which the impurities are present, so that the impurities are essentially not obliged to pass through the filter belt. In the event of currents of air being used for cleaning, it will be found to be advantageous if the air discharge opening is placed close to and, if necessary, in contact with the belt. This can be achieved by means of, for example, a guide roller 45 which makes contact with the filter belt 10 from its under side and counteracts the tendency for the belt to be moved away from the air discharge opening by the force of the blown air. The collecting receptacle 27 may, for example, exhibit an integral feed screw (not shown here) for the continuous transport of the waste sediment which is formed by the impurity particles, leading out to the side and into a large collecting vessel or for distribution as fertilizer.

The belt filter also contains an arrangement by means of which the repeated clogging of the filter can be further prevented. This is achieved by the filter belt being constructed from a material with an oligodynamic effect, so that biological organisms are not inclined to deposit themselves on the filter screen. This material preferably consists of a metal or a metal alloy which secretes trace elements which are toxic especially to organisms of the types which are inclined to deposit themselves on a filter. The selected metal may also produce an oxide layer in water, which layer is also toxic and counteracts the growth of micro-organisms. Other metals also have similar properties, for example tin, and to a certain extent silver and zinc, too. The use of copper and various kinds of alloys of copper, for example, such as brass and bronze, is also conceivable. This toxic effect is dependent to a certain extent on certain external circumstances; for example, a low pH value may stimulate the rate of corrosion in the metal and thus the release of ions. Although micro-organisms may have succeeded in depositing themselves on the metal surface, either they will die or their growth will be restricted to a considerable degree. The procedure consists essentially of the surface of the filter being caused to give off toxic substances, thereby counteracting the depositing of biological organisms on the filter surfaces, so that the filter openings do not become clogged.

The release of metal ions described above can be stimulated by means of an arrangement which is described in an entirely schematic fashion in the greatest detail in FIG. 3, but which is also referred to in FIGS. 1 and 2. This consists of an electrode plate 46 made of an appropriate metallic material, for example zinc, which is positioned in such a way that it is exposed to the flow of impurity particles in the water which is to be filtered. In the illustrated example the plate extends over the width of the filter and is positioned after the outlet end 14 of the pipe 15 and relatively close to the filter belt 10. By selecting the metal used in the electrode plate 46 so that its position in the electrolytic voltage chain is relatively far removed from the position of copper, a galvanic current will be created between the copper in the filter belt, which forms the sacrificial anode, and the electrode plate 46. This effect can be further stimulated by producing a closed circuit via a d.c. voltage source 47, as indicated entirely in schematic form in FIG. 3. The electrical connection to the belt filter is effected in an appropriate fashion, for example via a sliding contact or similar. The waste water constitutes an electrolyte for this purpose, and copper ions are released from the filter belt and migrate across to the electrode plate 46, thereby causing the toxic effect to increase and largely counteracting the depositing of micro-organisms on the filter belt. The release of ions is regulated in such a way that the filter belt is not consumed at an unfavourably rapid rate. For example, the rate of corrosion of copper in water in the absence of an external voltage source is of the order of 5–10 $\mu$m per year, which provides to all intents and purposes imperceptible consumption of the copper material.

The problems of clogging encountered in previousy disclosed filters are resolved by the belt filter in accordance with the invention described above and by its mode of operation, which problems otherwise rapidly render the filter unserviceable. This is a major problem, especially in fish breeding basins, where fish are present in very large numbers for a given volume of water, and where continuous contamination is caused by fish excrement and food remains, etc., while at the same time particularly strict requirements are imposed on the quality of the water in order to ensure a maximum rate of growth in the fish. In plants of this kind the belt filter may be incorporated in an at least partially closed system with recirculation of the water in the breeding basins, in which water from the basins is taken in the form of contaminated water through the pipe 15, and cleaned water is returned to the basin. In conjunction with this it is feasible in certain cases for the collecting receptacle 23 to be omitted and for the belt filter to be positioned above a basin so that cleaned water can fall directly down into the basin, in so doing also passing through the return part 12 of the filter belt for further cleaning. The frame 1 is thus entirely open in the downward sense, so that the water can fall freely straight down into the basin. As an alternative, the filter can be positioned along one edge of a basin, and a guide plate positioned at an angle beneath the belt filter can ensure the return of the cleaned water to the basin. If the belt filter is positioned at some other place (which is the most likely positioning) than in the immediate vicinity of the basin, the collecting receptacle can be utilized as a return line 24 via which the cleaned water is returned to the basin or basins.

The invention is not restricted to the illustrative embodiment described above and shown in the drawings, but may be varied within the scope of the following patent claims. Thus, for example, the filter belt can be provided along its longitudinal edge parts with upright, fixed supporting edges, for example made of rubber, which make contact with and, if necessary, project inwards beneath the edge parts of the belt as it advances in order to prevent the running away of contaminated water containing particles over the edge parts of the belt at its upper part 11.

The collecting receptacle 23 may be divided with advantage into sections by means of partitions 49 which extend across the direction of movement of the filter belt. These are not in direct communication with one another, but exhibit separate outlets which can be combined together to form a common outlet, whereby a greater inclination of the collecting receptacle is made possible whilst retaining the height of the side walls 25 of the receptacle. The receptacle will thus accompany the adjustment of the belt filter between different inclined positions. The electrode plate 46 is not an essential prerequisite for achieving the toxic effect. The same is true of the external voltage source, which increases this effect. Nor is it necessary for the belt filter to be made of a material with an oligodynamic effect. The arrangement 28 for the removal of particles can in principle be positioned at any desired point along the return part 12 of the filter. The back-pressure roller 45 shown in FIG. 1 is not in any way essential to the function, but can be omitted in many cases.

The drainage arrangement 17 can, for example, utilize hot air in order to reduce further the water content of the particles. Furthermore, the deflector device can have a form other than a curved form. It is important for the currents of air and thus the spray, which is directed essentially towards the deflector arrangement, to be controlled in a direction downwards towards the filter belt to a point ahead of the blowing-off point, that is to say in the opposite direction to the direction of movement of the upper part 11 of the belt. For example, the shield may consist of two angled plane surfaces which slope downwards towards the belt.

We claim:

1. A filter comprising: an endless filter screen belt extending around two spaced guide rollers so as to form an upper portion extending substantially horizontally, and a lower portion; means for advancing said filter screen belt around said rollers; means for discharging a liquid contaminated with particles onto the advancing substantially horizontally extending upper portion adjacent an upstream end thereof; receptacle means arranged below said filter screen belt for receiving liquid draining through said filter screen belt; means for receiving particles remaining on said filter screen belt and passed by said filter screen belt around the downstream one of said guide rollers; blower means arranged adjacent a downstream end of, and below, said upper portion for blowing a fluid through said upper portion from underneath to thereby dislodge liquid remaining on the filter screen belt; and deflector means arranged above said upper portion and above said blower means for directing the liquid dislodged by the fluid from said blower means forwardly opposite to the direction of advance of the filter screen belt; said deflector means comprising a deflection surface facing towards the upper portion of the filter screen belt and leaving a gap for the particles between said deflection surface and said upper portion.

2. A filter according to claim 1 further comprising means for varying the substantially horizontal inclination of the upper portion of the filter screen belt.

3. A filter according to claim 2, wherein said deflector is a shield having a curve profile.

4. A filter according to claim 1, wherein said receptacle means is arranged between said upper and lower portions of said filter screen belt, said receptacle means extending over essentially the width of the belt and at least over one-half of the distance between the two guide rollers; and means for adjusting the inclination of the receptacle means in accordance with that of the upper portion of the filter screen belt.

5. A filter according to claim 4, wherein said receptacle means is subdivided by partitions extending transverse to the direction of advance of the upper portion of the filter screen belt.

6. A filter according to claim 1 further comprising means for dislodging particles from the filter screen belt, said dislodging means being arranged between said upper and lower portions of the filter screen belt and being adapted to direct a fluid against the belt.

7. A filter according to claim 6, wherein said dislodging means is located adjacent the downstream guide roller and directs the fluid against the lower portion of the filter screen belt.

8. A filter according to claim 7, wherein said dislodging means is a pipe with at least one discharge opening.

9. A filter according to claim 7, wherein said dislodging means is a pipe with an elongated slot extending essentially across the width of the filter screen belt.

10. A filter according to claim 1, wherein said filter screen belt consists of a material resistant to adherence by bio-organisms.

11. A filter according to claim 10, wherein said material is a metal with an oligodynamic effect.

12. A filter according to claim 11, wherein said metal is copper or brass.

* * * * *